(12) United States Patent
Cameroni et al.

(10) Patent No.: US 11,799,274 B2
(45) Date of Patent: Oct. 24, 2023

(54) TOWER MOUNTED HIGH VOLTAGE SWITCHGEAR

(71) Applicant: Hitachi Energy Switzerland AG, Baden (CH)

(72) Inventors: Roberto Cameroni, Villano (IT); Carlo Granata, Cavenago d'Adda (IT)

(73) Assignee: HITACHI ENERGY SWITZERLAND AG, Baden (CH)

( * ) Notice: Subject to any disclaimer, the term of this patent is extended or adjusted under 35 U.S.C. 154(b) by 46 days.

(21) Appl. No.: 17/614,730

(22) PCT Filed: Mar. 25, 2020

(86) PCT No.: PCT/EP2020/058304
§ 371 (c)(1),
(2) Date: Nov. 29, 2021

(87) PCT Pub. No.: WO2020/239289
PCT Pub. Date: Dec. 3, 2020

(65) Prior Publication Data
US 2022/0231488 A1 Jul. 21, 2022

(30) Foreign Application Priority Data
May 31, 2019 (EP) .................................... 19177767

(51) Int. Cl.
*H02B 13/075* (2006.01)
*H02B 5/06* (2006.01)
(Continued)

(52) U.S. Cl.
CPC ............. *H02B 13/075* (2013.01); *H02B 3/00* (2013.01); *H02B 5/06* (2013.01); *H02B 13/035* (2013.01)

(58) Field of Classification Search
CPC ....... H02B 5/06; H02B 13/035; H02B 13/075
See application file for complete search history.

(56) References Cited

U.S. PATENT DOCUMENTS 2,689,888 A * 9/1954 Viboud .................... H02B 5/02
218/43
3,891,862 A * 6/1975 Clark ..................... H01H 33/02
361/603
(Continued)

FOREIGN PATENT DOCUMENTS

CN 1373921 A 10/2002
CN 1377515 10/2002
(Continued)

OTHER PUBLICATIONS

International Search Report and Written Opinion of the International Searching Authority, PCT/EP2020/058304, dated Jun. 5, 2020 12 pages.
(Continued)

*Primary Examiner* — Robert J Hoffberg
(74) *Attorney, Agent, or Firm* — Sage Patent Group

(57) ABSTRACT

A tower mounted high voltage gas-insulated switchgear including a supporting structure connected to the lattice structure of a high voltage transmission tower, a first and a second combined interruption and disconnection modules respectively including for each phase, a first and a second combined interruption and disconnection units, a first combined disconnecting and earthing switch having a first fixed contact operatively coupled to said first terminal, a second fixed contact at ground potential and a first movable contact operatively couplable to said first and second fixed contacts for disconnecting and earthing operations; a fast earthing switch interposed between said first fixed contact and said first terminal, a circuit breaker unit electrically connected to said first movable contact of said first combined disconnecting and earthing switch and to a second combined disconnecting and earthing switch.

20 Claims, 14 Drawing Sheets

(51) Int. Cl.
*H02B 13/035* (2006.01)
*H02B 3/00* (2006.01)

(56) References Cited

U.S. PATENT DOCUMENTS

| | | | | |
|---|---|---|---|---|
| 4,032,820 A * | 6/1977 | Oishi | ................ | H02B 1/22 218/75 |
| 4,237,520 A * | 12/1980 | Oishi | ................ | H02B 5/06 361/612 |
| 5,796,060 A | 8/1998 | Fuchsle et al. | | |
| 6,444,937 B1 * | 9/2002 | Piazza | ................ | H02B 13/055 218/43 |
| 6,664,493 B2 * | 12/2003 | Yamada | ................ | H02B 5/06 361/612 |
| 6,683,267 B1 * | 1/2004 | Piazza | ................ | H02B 13/035 218/7 |
| 6,727,454 B2 * | 4/2004 | Okabe | ................ | H02B 5/06 361/612 |
| 7,675,738 B2 * | 3/2010 | Fukunaga | ................ | H02B 13/0352 361/612 |
| 9,048,637 B2 * | 6/2015 | Harada | ................ | H02B 5/06 |
| 2003/0178891 A1 * | 9/2003 | Miyamoto | ................ | H02B 5/06 307/112 |
| 2023/0048351 A1 * | 2/2023 | Spezie | ................ | H02B 5/06 |

FOREIGN PATENT DOCUMENTS

| | | | | |
|---|---|---|---|---|
| CN | 1427518 | | 7/2003 | |
| CN | 101641755 | | 2/2010 | |
| CN | 106058709 A | * | 10/2016 | ............... H02B 1/22 |
| DE | 10013232 A1 | | 9/2001 | |
| EP | 1218995 A1 | | 7/2002 | |
| EP | 1121739 B1 | | 1/2006 | |
| FR | 1045034 A | | 11/1953 | |
| FR | 2786944 A1 | | 6/2000 | |
| WO | 0150487 A1 | | 7/2001 | |
| WO | WO-2021074814 A1 | * | 4/2021 | ............... H02B 5/02 |
| WO | WO-2021074815 A1 | * | 4/2021 | ............... H02B 3/00 |

OTHER PUBLICATIONS

Extended European Search Report dated Oct. 31, 2019 for European Patent Application No. 19177767.1, 6 pages.
European Intention to Grant dated Sep. 8, 2022, for European Patent Application No. 19177767.1, 7 pages.
ABB, "ABB switchgear provides safe and reliable power to busy streets of Bangkok," ABB Online Newsletter dated Dec. 19, 2017, 3 pages.
Notification of the First Office Action, Chinese Patent Application No. 202080046414.1, dated May 30, 2023, 4 pages.

* cited by examiner

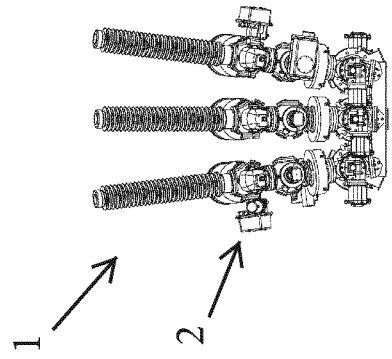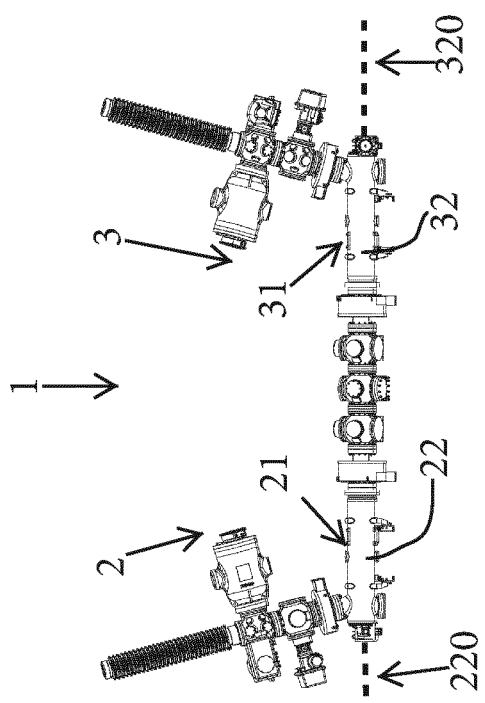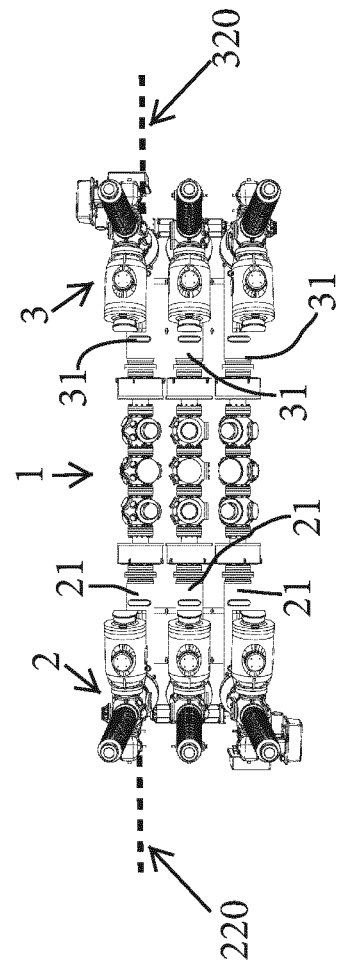

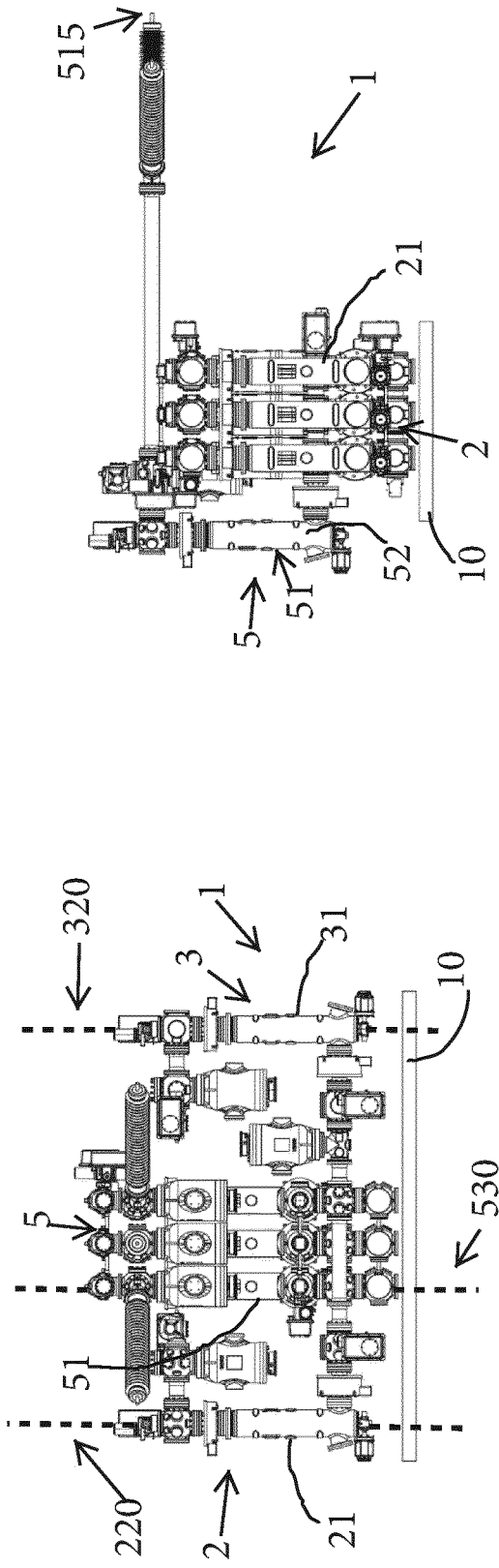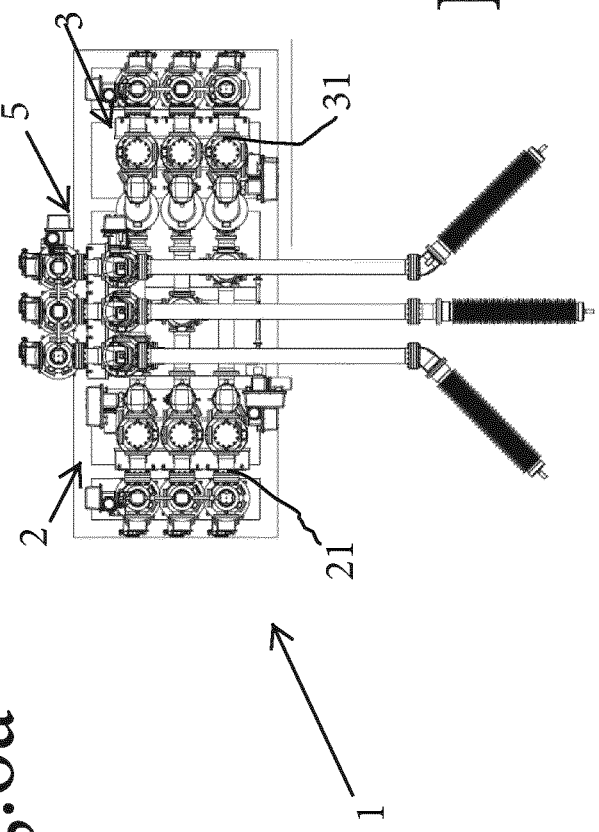

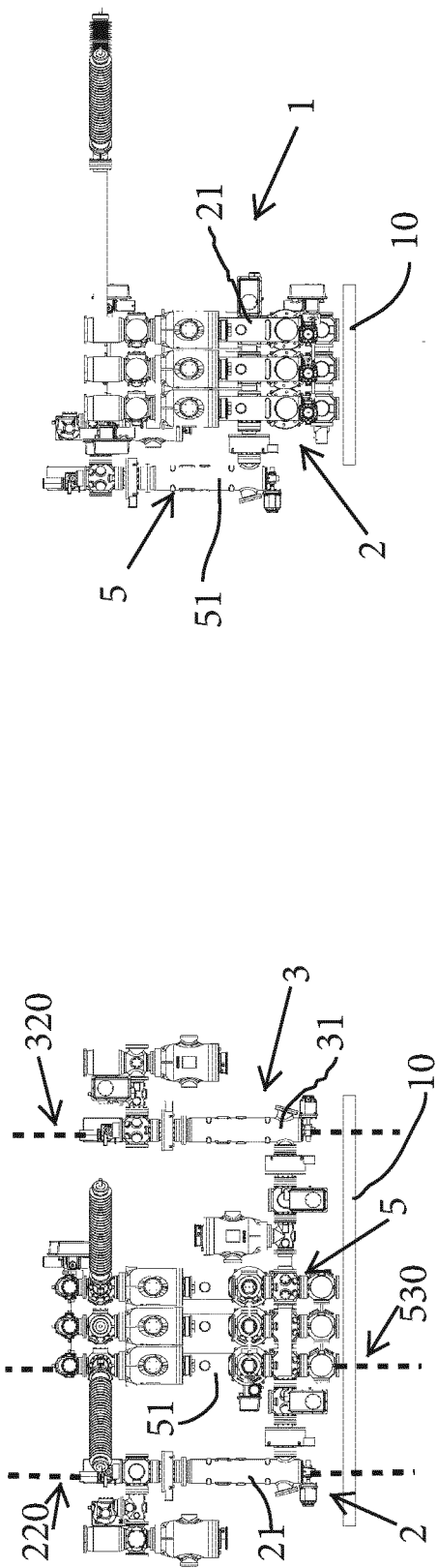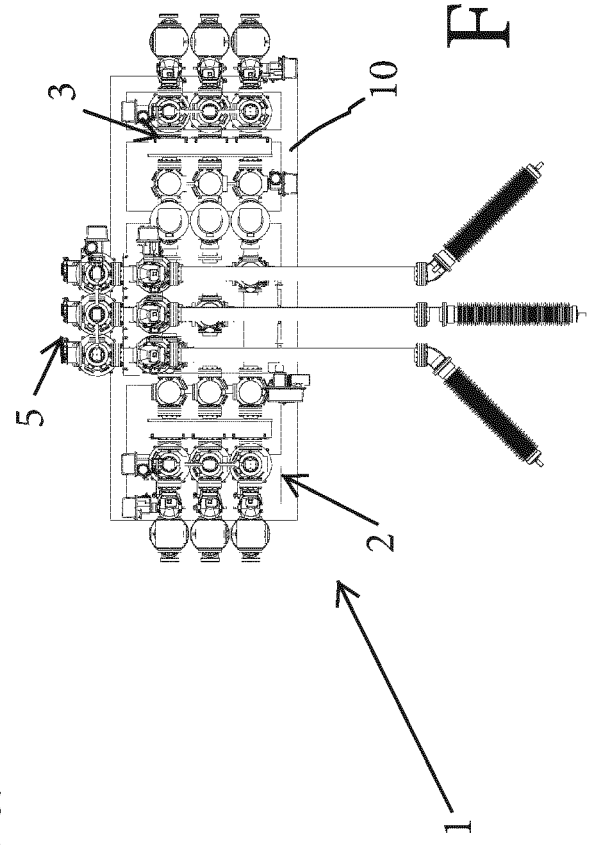

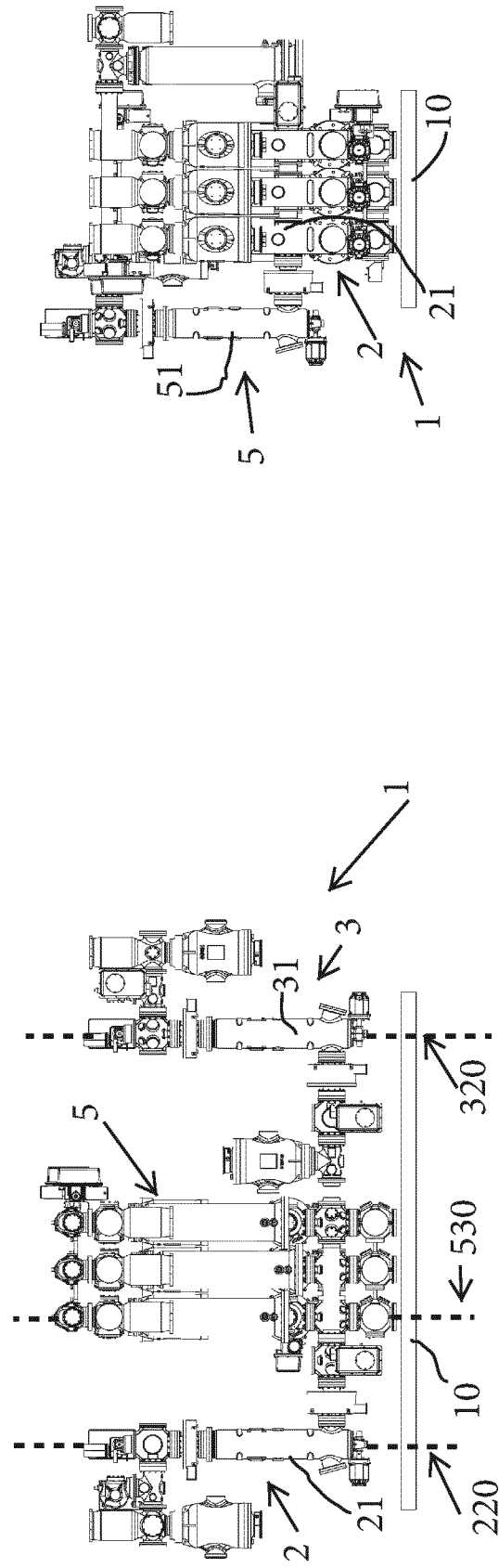
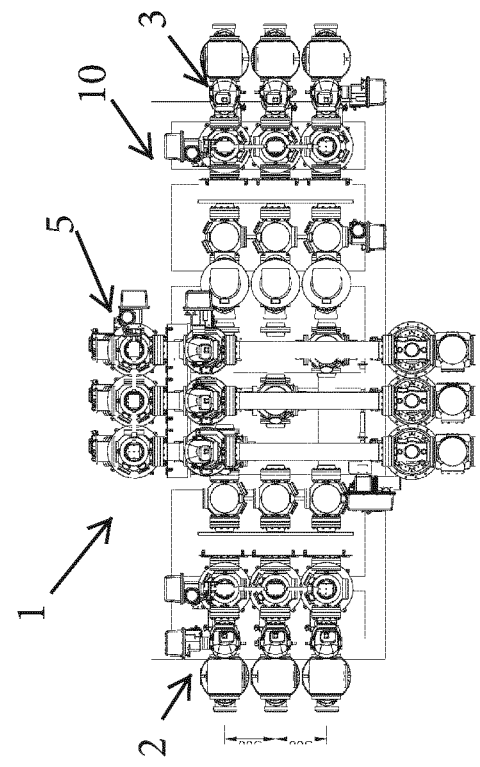
Fig.12a
Fig.12b
Fig.12c

TOWER MOUNTED HIGH VOLTAGE SWITCHGEAR

CROSS REFERENCE TO RELATED APPLICATIONS

This application is a 35 U.S.C. § 371 national stage application of PCT International Application No. PCT/EP2020/058304 filed on Mar. 25, 2020, which in turns claims foreign priority to European Patent Application No. 19177767.1, filed on May 31, 2019, the disclosures and content of which are incorporated by reference herein in their entirety.

FIELD

The present disclosure relates to a tower mounted high voltage switchgear, in particular a tower mounted high voltage gas-insulated switchgear having improved functions and characteristics.

BACKGROUND

It is well known in the art that along the path of a power grid there are provided several electric substations for transmitting and distributing electricity from a power generating source to loads and users connected to the feeding grid; these substations may be configured according to different layouts depending on the applications, and are realized by using a number of electric components, such as disconnectors, circuit breakers, instrument transformers, control systems and similar devices.

According to traditional solutions, electric substations are realized by using several components which are structurally independent and suitably connected to each other and to the power line when assembling in order to obtain the desired layout and to perform each a respective dedicated function; these traditional solutions have presented some drawbacks in practical use, mainly due to the large number of components that may be required, even for providing a minimal configuration, and to their structural and functional separation. Indeed, these aspects may result in heavy maintenance requirements for each and any of the components used, and to a considerable increase of the overall dimensions of the substation, with a consequent negative impact on installation and maintenance costs, as well as on environmental impact.

On the basis of the above considerations and other considerations, there is clearly a need to have available alternative technical solutions that will enable the limits and the problems set forth above to be overcome.

SUMMARY

Embodiments of the present disclosure may provide a high voltage gas-insulated switchgear which allows overcoming at least some of the above-mentioned shortcomings.

In particular, embodiments of the present disclosure may provide a high voltage gas-insulated switchgear that would avoid the need of requesting approval from local authorities.

Furthermore, embodiments of the present disclosure may provide a high voltage gas-insulated switchgear which would not be affected for its installation by the morphology of the land.

Moreover, embodiments of the present disclosure may provide a high voltage gas-insulated switchgear in which the environmental impact is minimized or eliminated.

Furthermore, embodiments of the present disclosure may provide a high voltage gas-insulated switchgear which is easily adaptable according to needs of the utilities.

Also, embodiments of the present disclosure may provide a high voltage gas-insulated switchgear, that is reliable and relatively easy to be manufactured out and at competitive costs.

Thus, embodiments of the present disclosure may relate to a tower mounted high voltage gas-insulated switchgear which characterized in that it comprises a supporting structure connected to the lattice structure of a high voltage transmission tower, a first and a second gas-insulated combined interruption and disconnection modules respectively comprising, for each phase, a first and a second combined interruption and disconnection units.

Each of said first and second combined interruption and disconnection units comprises a first and a second gas-tight casing developing along corresponding first and second reference axis, each casing housing: at least a first terminal for input/output connections; a first combined disconnecting and earthing switch having a first fixed contact operatively coupled to said first terminal, a second fixed contact at ground potential and a first movable contact operatively couplable to said first and second fixed contacts for disconnecting and earthing operations; a fast earthing switch interposed between said first fixed contact and said first terminal; a circuit breaker unit electrically connected to said first movable contact of said first combined disconnecting and earthing switch and to a second combined disconnecting and earthing switch; said second combined disconnecting and earthing switch having a third fixed contact operatively coupled to a second terminal for input/output connections, a fourth fixed contact at ground potential and a second movable contact operatively couplable to said third and fourth fixed contacts for disconnecting and earthing operations and electrically connected to said circuit breaker unit.

Said first terminal of said first combined interruption and disconnection unit is electrically connected to a first electrical line, and said first terminal of said second interruption and disconnection unit is electrically connected to a second electrical line, while the second terminals of said first and second combined interruption and disconnection units are electrically coupled to each other.

The high voltage gas-insulated switchgear is mounted on said supporting structure within the lattice structure of said high voltage transmission tower, the first and second reference axis of said first and second casings being aligned in the same direction.

As better explained in the following description, the tower mounted high voltage gas-insulated switchgear as disclosed herein may allow avoiding, or at least greatly reducing, the above-mentioned problems.

In practice, as better described hereinafter, one proposed solution may include placing the high voltage gas-insulated switchgear in the tower of the overhead lines. This solution avoids the request of approval from local authorities as there is no occupation of new land and results in a faster and cheaper solution for the customer.

In practice, the high voltage gas-insulated switchgear can be fully assembled and tested in the factory and then transported at site. Once mounted in the tower, possibly together with the local control cubicle, the high voltage gas-insulated switchgear is ready to be energized. Monitoring and self-diagnostics systems integrated in the equipment allow a remote control of the status of the equipment itself further increasing the reliability of the solution.

As described in details in the following description, several configurations can be realized keeping as a constrain the footprint of the tower, for example. For instance, a typical configuration can be a 3 bays system (in-out bays plus user bay) to be mounted in the tower at different height from the ground depending on customer requests. As mentioned before the system may stay in the tower footprint so to avoid the need of permission.

In a typical embodiment of the tower mounted high voltage switchgear, according to the present disclosure, said first and second combined interruption and disconnection modules are positioned at a height within the lattice structure of said high voltage transmission tower.

Alternatively, said first and second combined interruption and disconnection modules can also be positioned within the lattice structure of said high voltage transmission tower in correspondence of its base.

In an embodiment of the tower mounted high voltage switchgear of the present disclosure said first and second reference axis of said first and second casings are aligned along a common axis.

Alternatively, said first and second reference axis of said first and second casings can be parallel to each other.

As previously said, in a typical embodiment of a tower mounted high voltage switchgear as disclosed herein, the configuration is a 3 bays system (in-out bays plus user bay); in such a case, the tower mounted high voltage switchgear further comprises a third gas-insulated combined interruption and disconnection module having a first terminal operatively connectable to an end user, and a second terminal electrically interposed between and connected to said first and second combined interruption and disconnection modules.

In such a case, said third combined interruption and disconnection module comprises, for each phase, a third combined interruption and disconnection unit which in turn comprises a third casing developing along a third reference axis and housing: at least a first terminal operatively connectable to an end user; a first combined disconnecting and earthing switch having a first fixed contact operatively coupled to said first terminal, a second fixed contact at ground potential and a first movable contact operatively couplable to said first and second fixed contacts for disconnecting and earthing operations; a fast earthing switch interposed between said first fixed contact and said first terminal; a circuit breaker unit electrically connected to said first movable contact of said first combined disconnecting and earthing switch and to a second combined disconnecting and earthing switch; said second combined disconnecting and earthing switch having a third fixed contact operatively coupled to a second terminal electrically interposed between and connected to said first and second combined interruption and disconnection modules, a fourth fixed contact at ground potential and a second movable contact operatively couplable to said third and fourth fixed contacts for disconnecting and earthing operations and electrically connected to said circuit breaker unit.

The tower mounted high voltage switchgear can have different configurations and layouts according to the needs.

For instance, the third combined interruption and disconnection module can be positioned within the lattice structure of said high voltage transmission tower at the same height of said first and second combined interruption and disconnection modules.

Alternatively, said third combined interruption and disconnection module can be positioned within the lattice structure of said high voltage transmission tower at a different height with respect to said first and second combined interruption and disconnection modules.

Moreover, in a possible embodiment of the tower mounted high voltage switchgear of the present disclosure, said first, second and third reference axis of said first, second and third casings are parallel to each other.

In an alternative layout of the tower mounted high voltage switchgear of the present disclosure, said first and second reference axis of said first and second casings are aligned along a common axis, while said third reference axis of said third casing is substantially perpendicular to said first and second reference axis.

In this latter case, said third combined interruption and disconnection module can be conveniently positioned within the lattice structure of said high voltage transmission tower at a different height with respect to said first and second combined interruption and disconnection modules.

In an embodiment of the tower mounted high voltage switchgear, according to the present disclosure, said first and second reference axis of said first and second casings are substantially horizontal. In such a case, the third reference axis of said third casing can be substantially vertical.

In an alternative embodiment of the tower mounted high voltage switchgear, according to the present disclosure, said first, second and third reference axis of said first, second and third casings are substantially vertical.

Further features and advantages of the present disclosure will be more clear from the description of embodiments of the tower mounted high voltage gas-insulated switchgear of the present disclosure, shown by way of examples in the accompanying drawings.

BRIEF DESCRIPTION OF THE DRAWINGS

FIGS. 3a-3c show two side views and a top view of a first embodiment of a high voltage gas-insulated switchgear;

FIGS. 6a-6c show two side views and a top view of a second embodiment of a high voltage gas-insulated switchgear;

FIGS. 10a-10c show two side views and a top view of a fourth embodiment of a high voltage gas-insulated switchgear;

FIGS. 12a-12c show two side views and a top view of a fifth embodiment of a high voltage gas-insulated switchgear;

DETAILED DESCRIPTION

Figure 1:
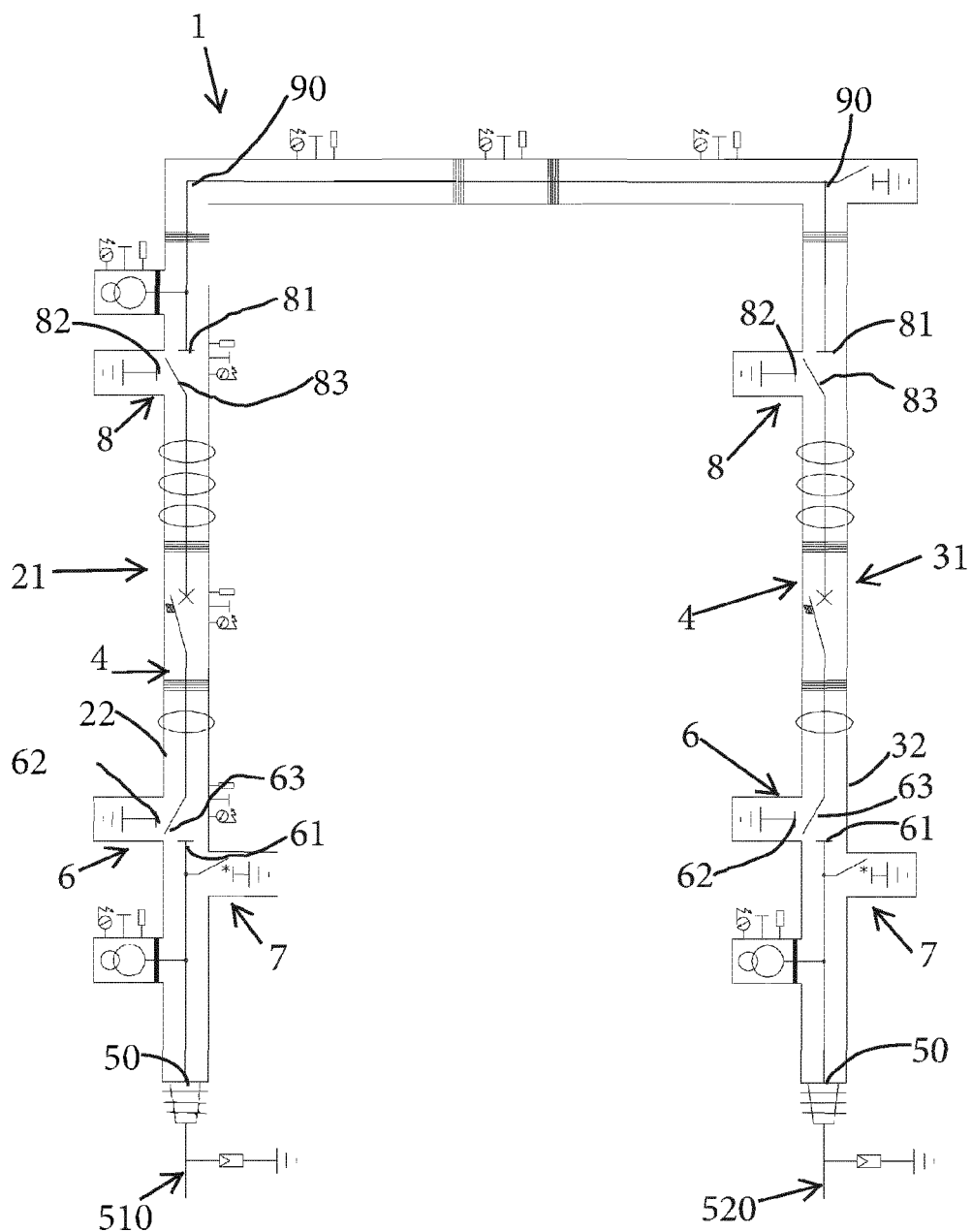
FIG. 1 is a single line diagram of a first embodiment of a tower mounted high voltage gas-insulated switchgear.

In recent years a new generation of compact gas-insulated switchgear devices has been designed which integrate in a unique apparatus and are able to perform several electrical functions which, in the prior substations, were obtained by using multiple structurally separate elements. In particular, these new devices comprise an external casing on which there are mounted a number of bushings, e.g. two or three bushings, each containing a corresponding electric terminal for input/output connections with a power line and/or other elements of the substation; inside the casing there are normally provided one or more disconnection units and one or more interruption units, which are electrically connected to each other and to the electric terminals, in such a way that electrical disconnection and/or circuit breaker maneuvers are performed in a coordinated way.

In this framework, electrical utilities are more and more requested to increase the resilience of the network minimizing the risk of outage due to unexpected conditions. To do so, remotely controlled high voltage switchgears are needed in many strategic points of the network.

A dedicated area is in general needed for the installation of the high voltage switchgear and in many cases the land needed for the equipment may require a long and expensive process to get the approval from the local authorities. It may also happen frequently that the land needed is not available due, e.g., to permissions denied (for instance in urbanized areas) or to insufficient space (for instance in rural areas, or in areas morphologically not suitable such us mountains). It can therefore happen that utilities are forced to stop the project.

With reference to the attached figures a tower mounted high voltage switchgear of the present disclosure, designated with the reference numeral 1, in its more general definition comprises a supporting structure 10 which is connected to the lattice structure 11 of a high voltage transmission tower 12.

Figure 2:
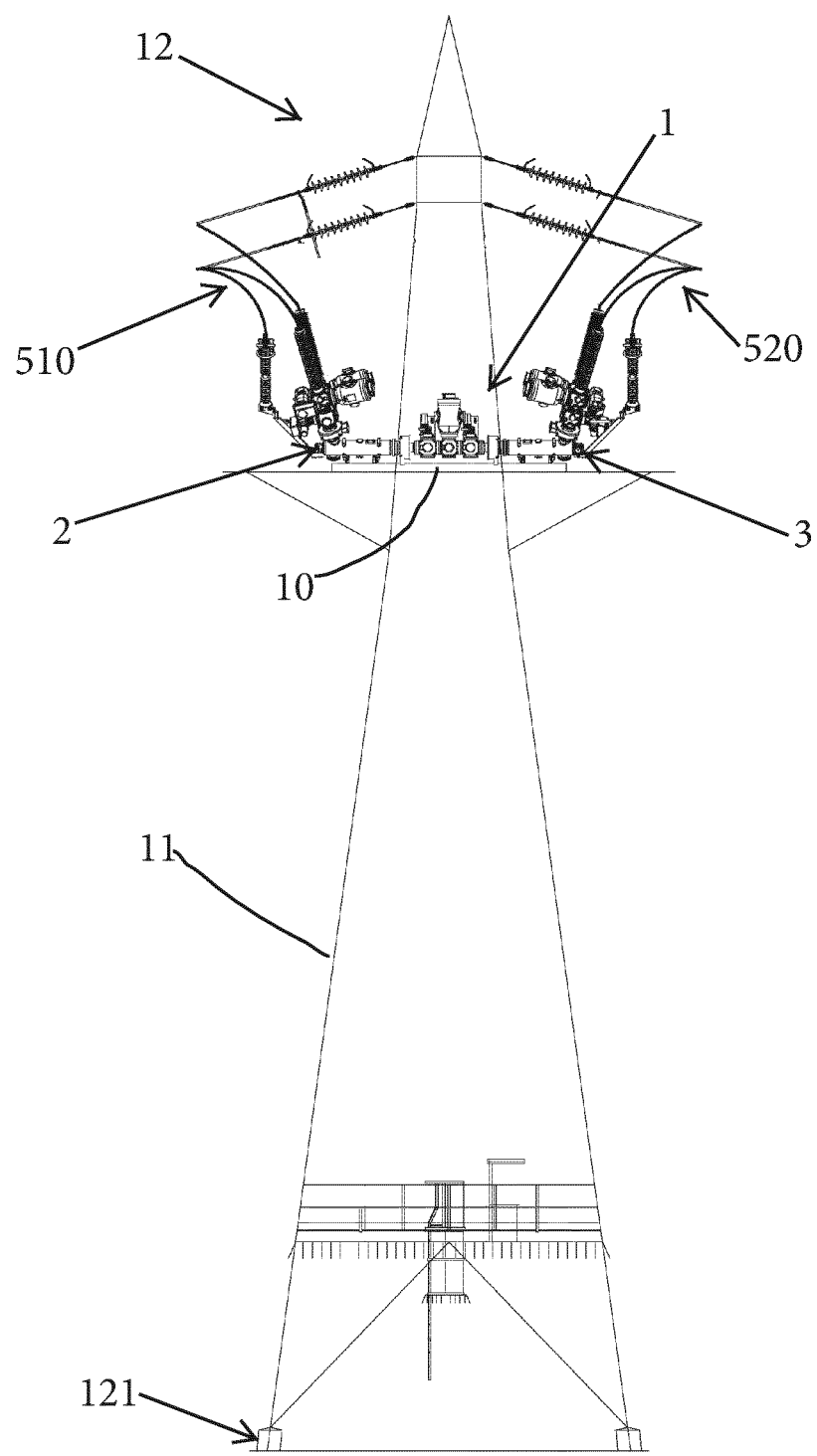
FIG. 2 shows the positioning of a first embodiment of a high voltage gas-insulated switchgear in a high voltage transmission tower.

With reference to FIGS. 1-3, in a first embodiment the high voltage switchgear 1 comprises a first 2 and a second 3 combined interruption and disconnection modules respectively comprising, for each phase, a first 21 and a second 31 combined interruption and disconnection units.

For a general description of the combined interruption and disconnection modules reference is made to the description made and the patent documents mentioned in the introductory part of this disclosure.

Each of said first 21 and second 31 combined interruption and disconnection units comprises a first 22 and a second 32 gas-tight casing developing along corresponding first 220 and second 320 reference axis.

Said casing 22 and 32 each houses at least a first terminal 50 for input/output connections and a first combined disconnecting and earthing switch 6. The combined disconnecting and earthing switch 6 can be of known type and typically has a first fixed contact 61 which is operatively coupled to said first terminal 50, a second fixed 62 contact at ground potential, and a first movable contact 63 which is operatively couplable to said first 61 and second 62 fixed contacts for disconnecting and earthing operations according to known principles.

In each of said casing 22 and 32 there is also positioned a fast earthing switch 7 which is interposed between said first fixed contact 61 and said first terminal 50. The fast earthing switch 7 can be of known type and will not be described in further details.

A circuit breaker unit 4 is also positioned inside each casing 22 and 32 and is electrically connected to the first movable contact 63 of said first combined disconnecting and earthing switch 6 and to a corresponding second combined disconnecting and earthing switch 8, which is also housed inside each of said casings 22 and 32.

Said second combined disconnecting and earthing switch 8 can be of known type and typically has having a third fixed contact 81 which is operatively coupled to a second terminal 90 for input/output connections, a fourth fixed contact 82 at ground potential, and a second movable contact 83 which is electrically connected to said circuit breaker unit 4 and operatively couplable to said third 81 and fourth 82 fixed contacts for disconnecting and earthing operations according to known principles.

In practice, as clearly shown, said first 21 and second 31 combined interruption and disconnection units are structurally and functionally identical to each other.

The first terminal 50 of said first combined interruption and disconnection unit 21 is electrically connected to a first electrical line 510, while the first terminal 50 of said second interruption and disconnection unit 31 is electrically connected to a second electrical line 520. Moreover, the second terminals 90 of said first 21 and second 31 combined interruption and disconnection units being electrically coupled to each other, thereby realizing a typical two-bays in-out configuration.

As shown in the attached figures, the high voltage switchgear 1 is mounted on said supporting structure 10 within the lattice structure 11 of said high voltage transmission tower 12, thereby avoiding any land occupation outside the footprint of tower 12 itself.

A further feature of the tower mounted high voltage switchgear is given by the fact that the first 220 and second 320 reference axis of said first 22 and second 32 casings are aligned in the same direction, thereby achieving a very compact structure that can be housed within the lattice structure 11 of the high voltage transmission tower 12.

As shown in FIGS. 2, 5, 7a, 7b, 9a, 9b and 13a, 13b, in various embodiment of the high voltage switchgear 1, said first 2 and second 3 combined interruption and disconnection modules can be positioned at different heights within the lattice structure 11 of said high voltage transmission tower 12.

Figure 11A:
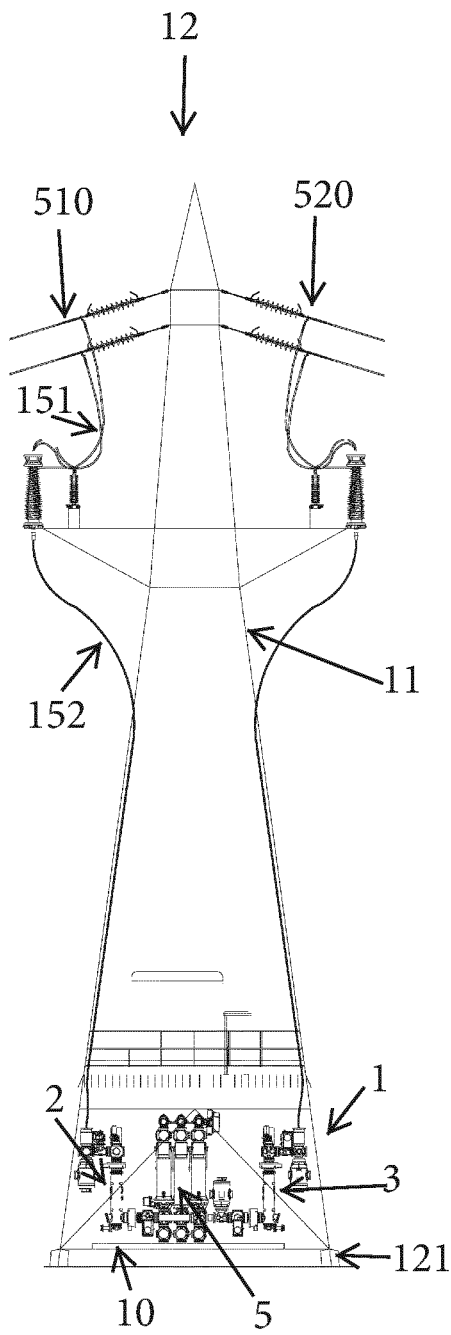
FIGS. 11a and 11b show the positioning of a fifth embodiment of a high voltage gas-insulated switchgear in a high voltage transmission tower.
Figure 11B:
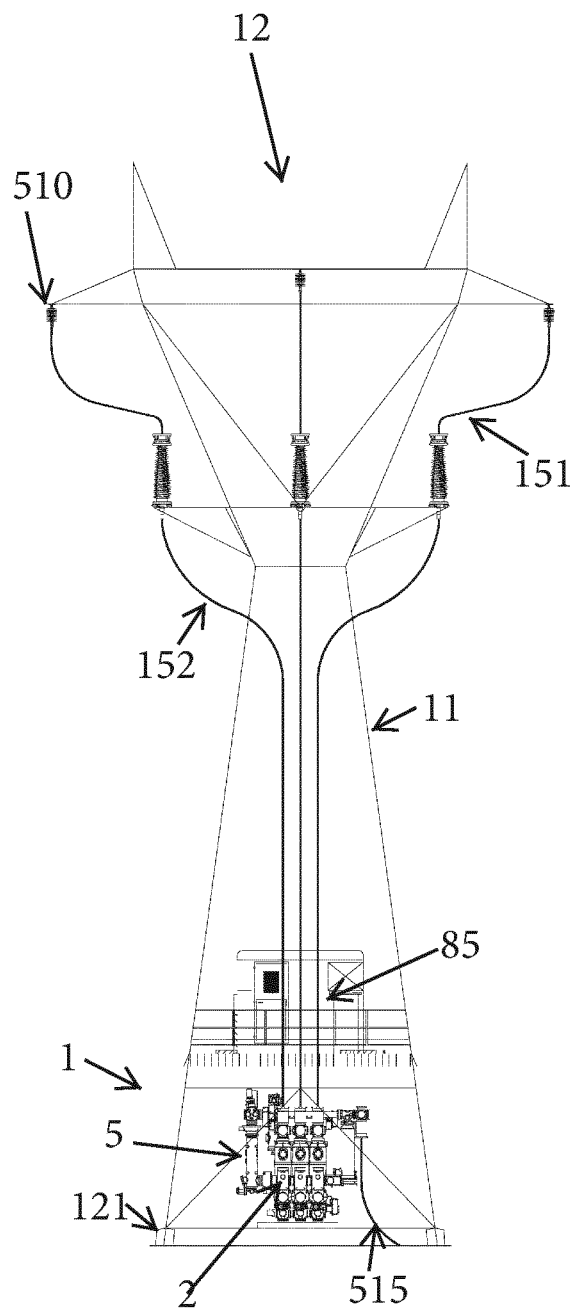

Alternatively, as shown in FIGS. 11a and 11b, said first 2 and second 3 combined interruption and disconnection modules can be positioned within the lattice structure 11 of said high voltage transmission tower 12 in correspondence of its base 121.

A control cubicle 85 can be also mounted at different heights within the lattice structure 11 of said high voltage transmission tower 12.

As shown in FIGS. 3a-3c, in an embodiment of the tower mounted high voltage switchgear 1, said first 220 and second 320 reference axis of said first 22 and second 32 casings are aligned along a common axis, e.g., substantially horizontal.

Alternatively, as shown in FIGS. 6a-6c, 8a-8c, 10a-10c, 12a-12c said first 220 and second 320 reference axis of said first 22 and second 32 casings are parallel to each other, e.g., in a substantially vertical orientation.

In practice, the layout can be adapted to the available space within the lattice structure 11 of the high voltage transmission tower 12, by maintaining the modules aligned on a same horizontal plane or on different parallel vertical planes.

In typical embodiments of the tower mounted high voltage switchgear 1, shown in FIGS. 4-14, the configuration can be a 3 bays system (in-out bays plus user bay). In practice, in such embodiments, the tower mounted high voltage switchgear 1 comprises—in addition to the first 2 and second 3 combined interruption and disconnection modules—also a third combined interruption and disconnection module 5 which has a first terminal 50 operatively connectable to an end user, and a second terminal 90 which is electrically interposed between and connected to said first 2 and second 3 combined interruption and disconnection modules.

Figure 4:
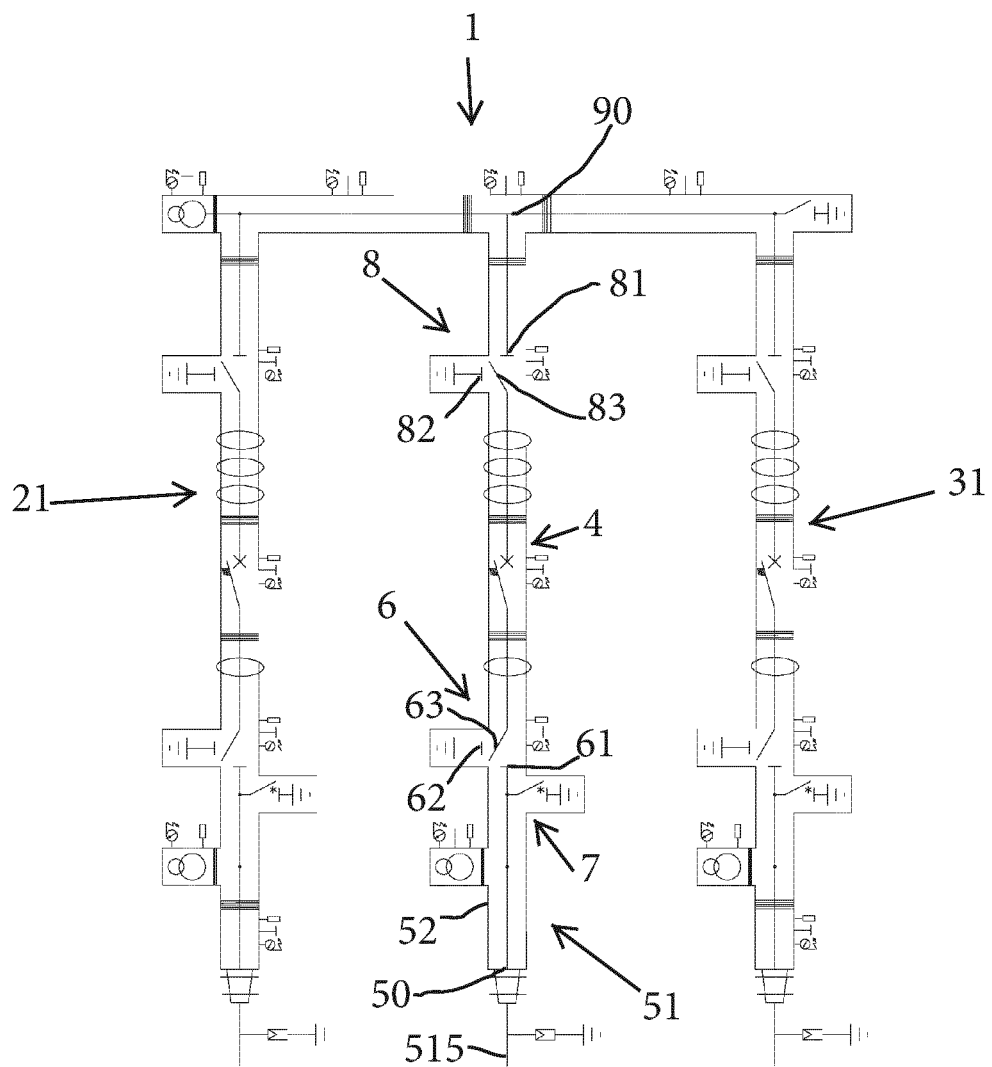
FIG. 4 is a single line diagram of a second embodiment of a tower mounted high voltage gas-insulated switchgear.
Figure 5:
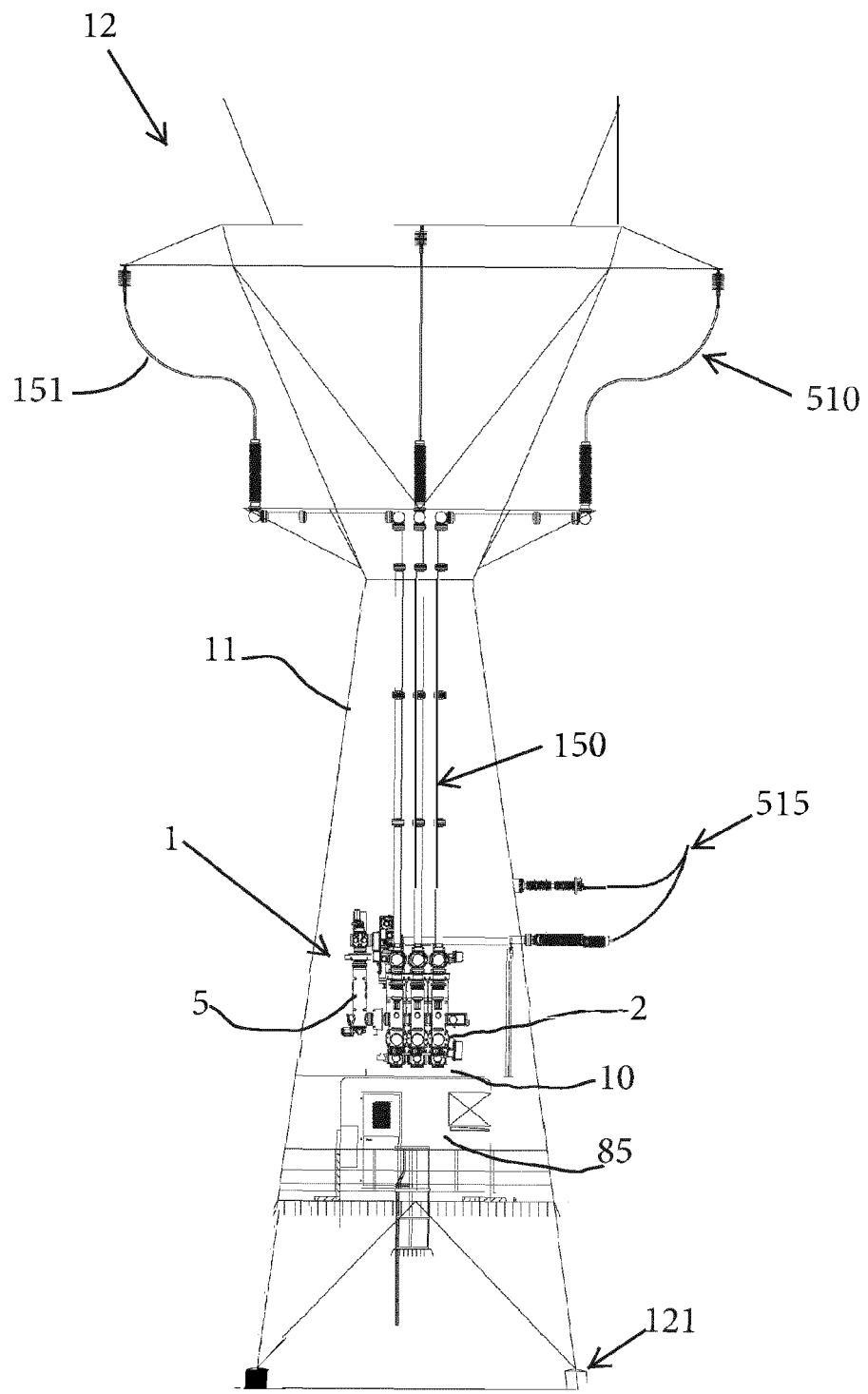
FIG. 5 shows the positioning of a second embodiment of a high voltage gas-insulated switchgear in a high voltage transmission tower.
Figure 7A:
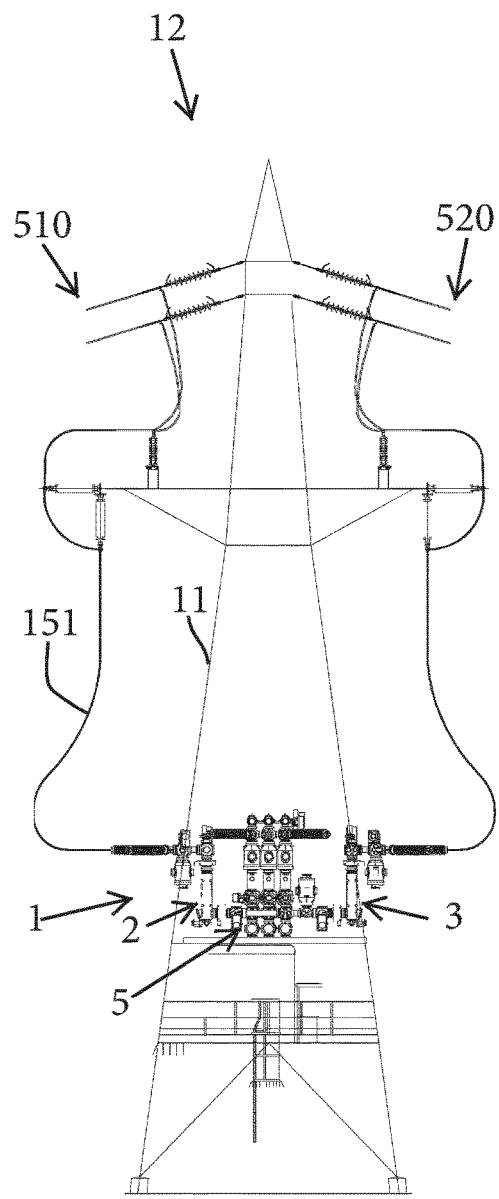
FIGS. 7a and 7b show the positioning of a third embodiment of a high voltage gas-insulated switchgear in a high voltage transmission tower.
Figure 7B:
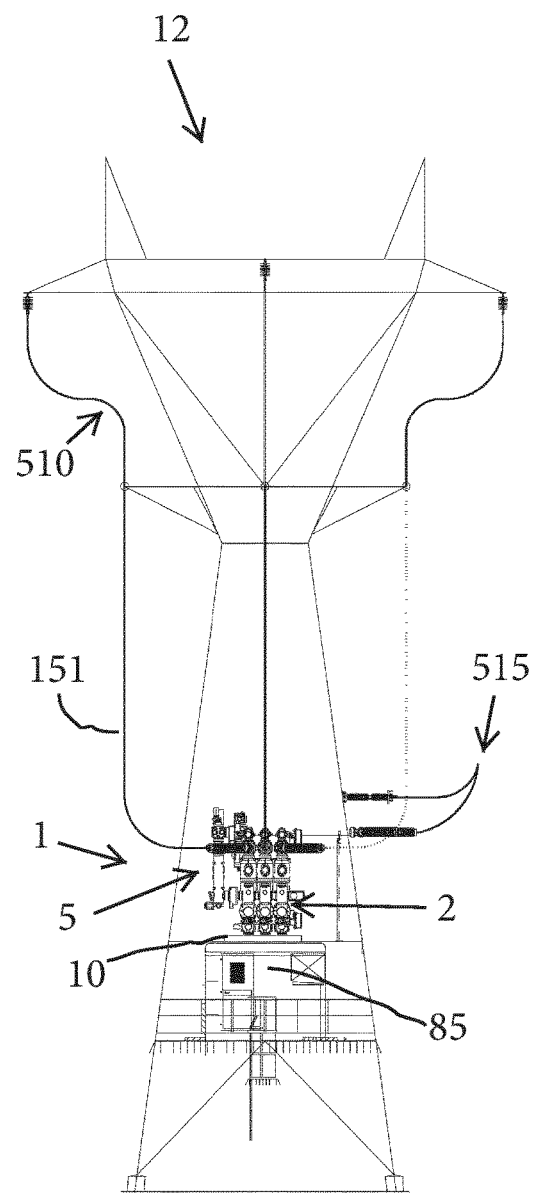
Figure 8B:
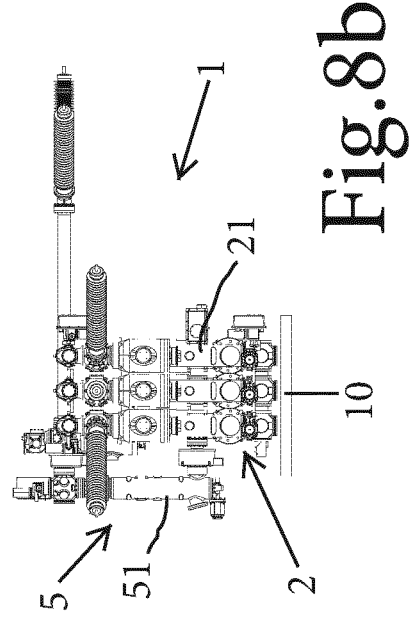
FIGS. 8a-8c show two side views and a top view of a third embodiment of a high voltage gas-insulated switchgear.
Figure 8A:
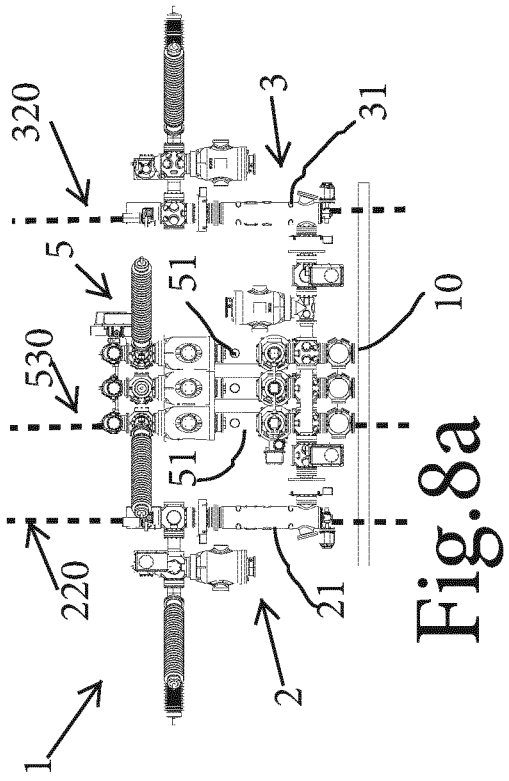
Figure 8C:
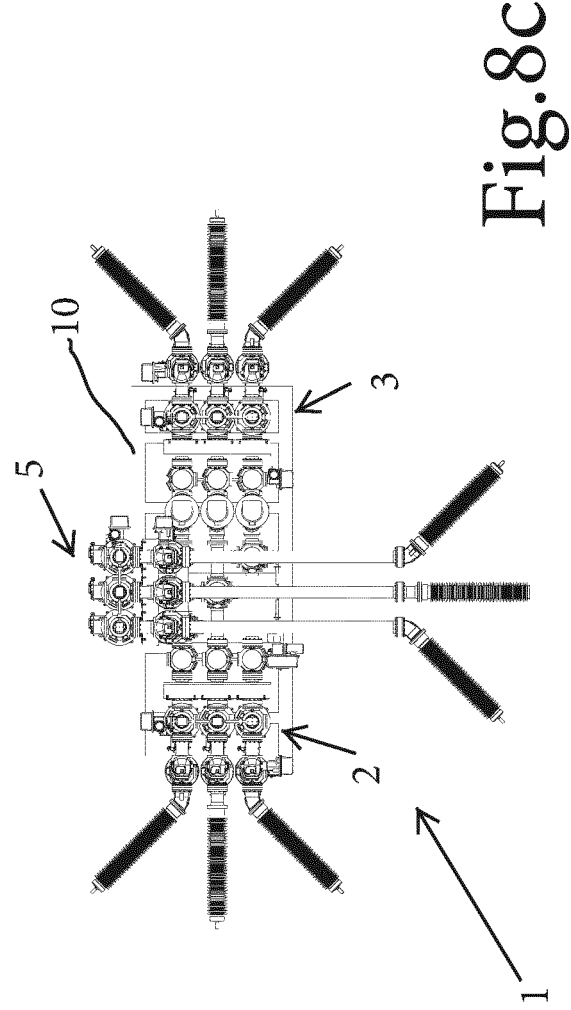
Figure 9A:
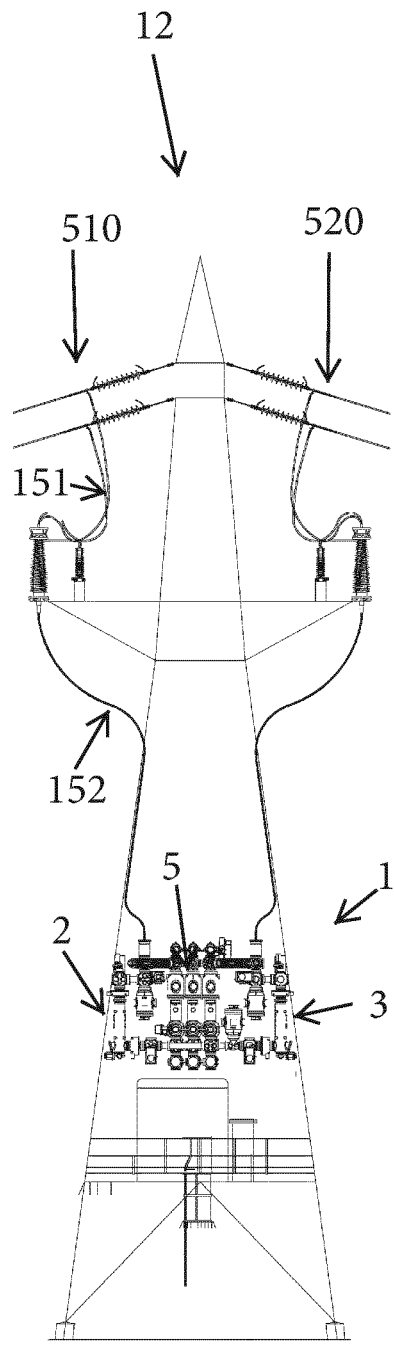
FIGS. 9a and 9b show the positioning of a fourth embodiment of a high voltage gas-insulated switchgear in a high voltage transmission tower.
Figure 9B:
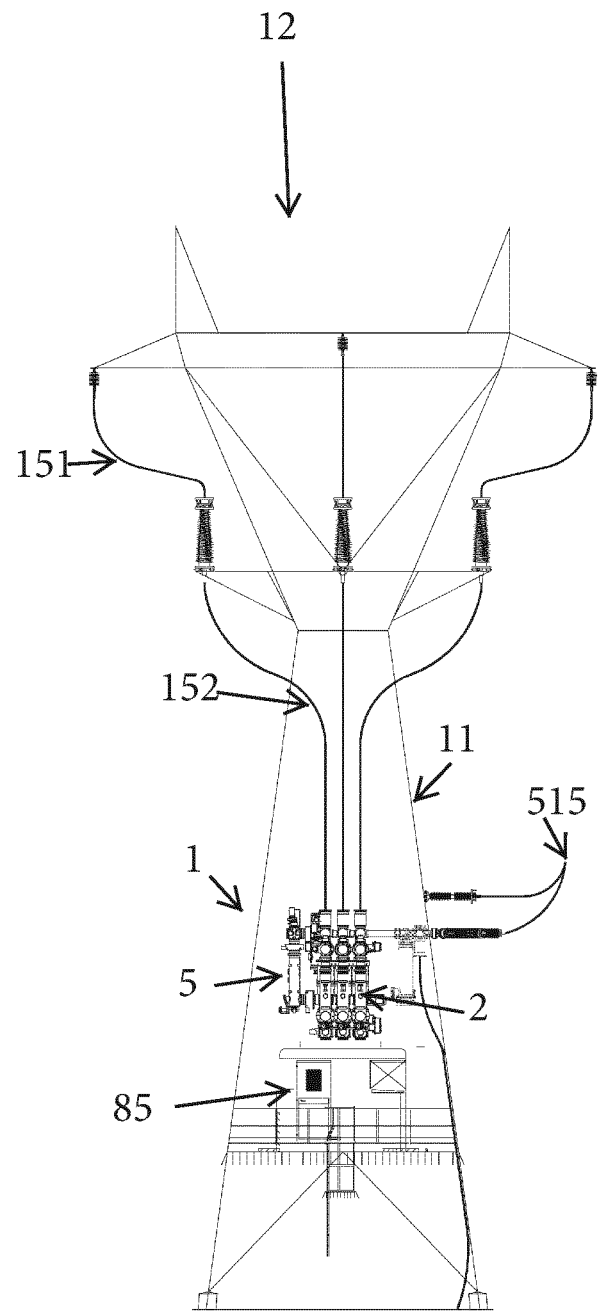

In particular, with particular reference to FIG. 4, in these embodiments said third combined interruption and disconnection module 5 comprises, for each phase, a third combined interruption and disconnection unit 51, which in turn comprises a third casing 52 developing along a third reference axis 530.

Said casing 52 houses at least a first terminal 50 which is operatively connectable to an end user and a first combined disconnecting and earthing switch 6.

The combined disconnecting and earthing switch 6 can be of known type and typically has a first fixed contact 61 which is operatively coupled to said first terminal 50, a second fixed 62 contact at ground potential, and a first movable contact 63 which is operatively couplable to said first 61 and second 62 fixed contacts for disconnecting and earthing operations according to known principles.

In said casing 52 there is also positioned a fast earthing switch 7 which is interposed between said first fixed contact 61 and said first terminal 50. The fast earthing switch 7 can be of known type and will not be described in further details.

A circuit breaker unit 4 is also positioned inside said casing 52 and is electrically connected to the first movable contact 63 of said first combined disconnecting and earthing switch 6 and to a corresponding second combined disconnecting and earthing switch 8, which is also housed inside said casing 52.

Said second combined disconnecting and earthing switch 8 can be of known type and typically has having a third fixed contact 81 which is operatively coupled to a second terminal 90 electrically interposed between and connected to said first 2 and second 3 combined interruption and disconnection modules, a fourth fixed contact 82 at ground potential, and a second movable contact 83 which is electrically connected to said circuit breaker unit 4 and operatively couplable to said third 81 and fourth 82 fixed contacts for disconnecting and earthing operations according to known principles.

With reference to FIGS. 5, 7a, 7b, 9a, 9b, 11a, 11b, in typical embodiments of the tower mounted high voltage switchgear 1, said third combined interruption and disconnection module 5 is positioned within the lattice structure 11 of said high voltage transmission tower 12 at the same height of said first 2 and second 3 combined interruption and disconnection modules.

Figure 13A:
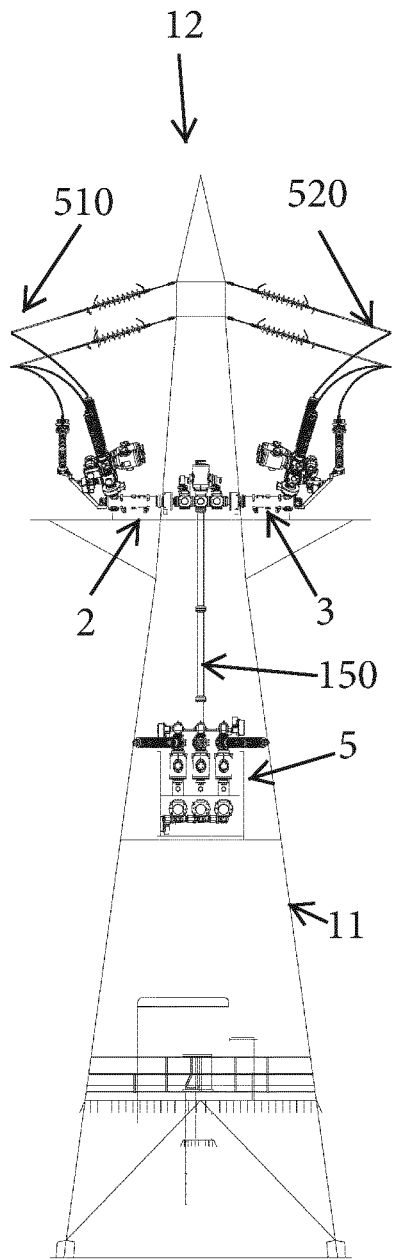
FIGS. 13a and 13b show the positioning of a sixth embodiment of a high voltage gas-insulated switchgear in a high voltage transmission tower.
Figure 13B:
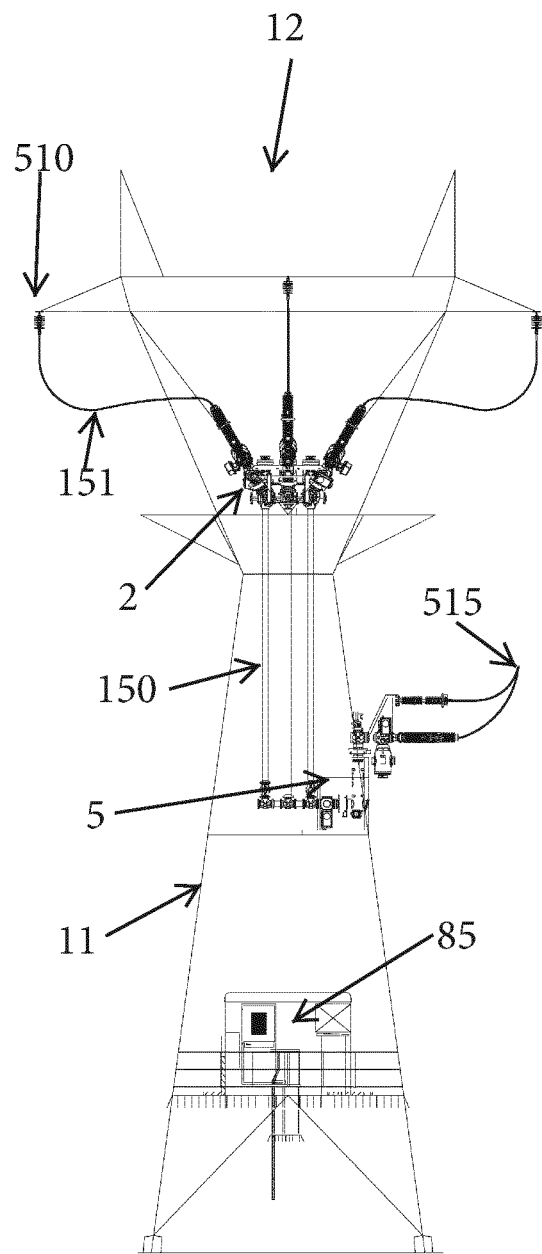
Figure 14B:
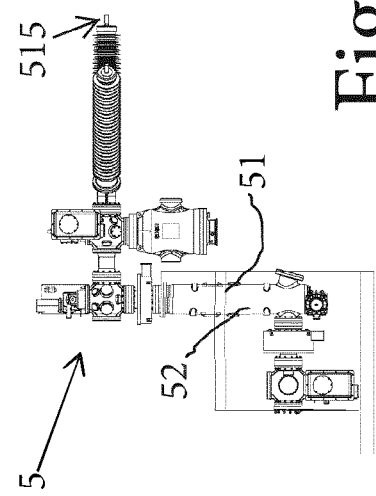
FIGS. 14a-14c show two side views and a top view of a third combined interruption and disconnection module used in a sixth embodiment of a high voltage gas-insulated switchgear.
Figure 14C:
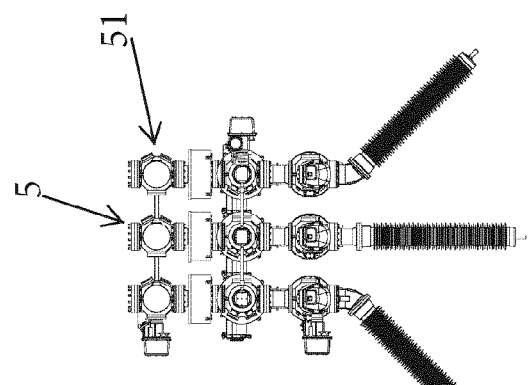
Figure 14A:
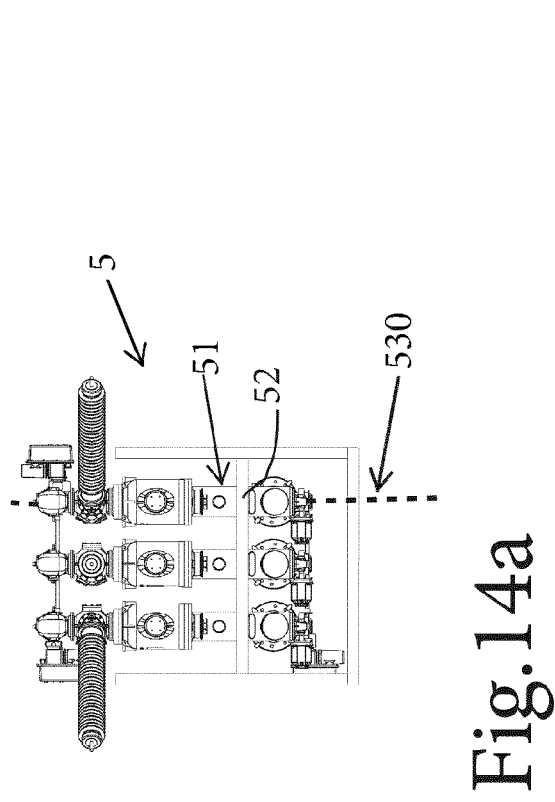

Alternatively, as shown in FIGS. 13a and 13b, said third combined interruption and disconnection module 5 is positioned within the lattice structure 11 of said high voltage transmission tower 12 at a different height with respect to said first 2 and second 3 combined interruption and disconnection modules.

Moreover, as shown in FIGS. 6a-6c, 8a-8c, 10a-10c, 12a-12c said first 220, second 320 and third 530 reference axis of said first 22, second 32 and third 52 casings are parallel to each other.

Alternatively, as shown in FIG. 13a-13b, 3a-3c, 14a-14c said first 220 and second 320 reference axis of said first 22 and second 32 casings are aligned along a common axis while said third reference axis 530 of said third casing 52 is substantially perpendicular to said first 220 and second 320 reference axis.

In this latter case, as shown in FIGS. 13a-13, the third combined interruption and disconnection module 5 is advantageously positioned within the lattice structure 11 of said high voltage transmission tower 12 at a different height with respect to said first 2 and second 3 combined interruption and disconnection modules.

Thus, as shown in the attached figures, several configurations of the switchgear can be realized according to the needs, having as only constrain to remain within the footprint of the tower in these embodiments.

For instance, in the embodiments of the tower mounted high voltage switchgear 1 shown in FIGS. 2, 3a-3c, 13a-13b the first 220 and second 320 reference axis of said first 22 and second 32 casings are substantially horizontal.

Alternatively, as shown in FIGS. 5, 6a-6c, 7a, 7b, 8a-8c, 9a, 9b, 10a-10c 11a, 11b, 12a-12c, said first 220, second 320 and third 530 reference axis of said first 22, second 32 and third casings 52 are substantially vertical.

Depending on the configuration and layout chosen, the connections with the lines 510, 521 and with the end user(s) 515 can be made with conductors 151, insulated cables 152, or insulated ducts 150.

It is clear from the above that the tower mounted high voltage switchgear of the present disclosure allows solving the previously underlined technical problems.

Several variations can be made to the tower mounted high voltage switchgear thus conceived, all falling within the scope of the attached claims. In practice, the materials used and the contingent dimensions and shapes can be any, according to desired requirements and to the state of the art.

The invention claimed is:

1. An arrangement comprising:
   a high voltage transmission tower having a lattice structure; and
   a tower mounted high voltage gas-insulated switchgear comprising:
      a supporting structure within said lattice structure of said high voltage transmission tower; and
      a plurality of gas-insulated combined interruption and disconnection modules including first and second gas-insulated combined interruption and disconnection modules, each of said gas-insulated combined interruption and disconnection modules comprising, for each phase:
         a combined interruption and disconnection unit, each of said combined interruption and disconnection unit comprising a gas-tight casing developing along a reference axis and housing at least a terminal for at least an input/output connection or to an end user;
         a first combined disconnecting and earthing switch having a first fixed contact operatively coupled to said first terminal of said at least said terminal, a second fixed contact at ground potential and a first movable contact operatively couplable to said first and second fixed contacts for disconnecting and earthing operations;

a second combined disconnecting and earthing switch, said second combined disconnecting and earthing switch having a third fixed contact operatively coupled to a second terminal of said at least said terminal, a fourth fixed contact at said ground potential and a second movable contact operatively couplable to said third and fourth fixed contacts for disconnecting and earthing operations, a fast earthing switch interposed between said first fixed contact and said first terminal; and a circuit breaker unit electrically connected to said first movable contact of said first combined disconnecting and earthing switch and to said second movable of said second combined disconnecting and earthing switch, said first terminal of said first combined interruption and disconnection unit being electrically connected to a first electrical line of said at least said input/output connection, said first terminal of said second interruption and disconnection unit being electrically connected to a second electrical line of said at least said input/output connection, said second terminals of said first and second combined interruption and disconnection units being electrically coupled to each other, said high voltage gas-insulated switchgear being mounted on said supporting structure within said lattice structure of said high voltage transmission tower, and said reference axes of said gas-tight casings of said first and second gas-insulated combined interruption and disconnection modules being aligned in a same direction.

2. The arrangement according to claim 1, wherein said first and second combined interruption and disconnection modules are positioned at a height within said lattice structure of said high voltage transmission tower.

3. The arrangement according to claim 1, wherein said first and second combined interruption and disconnection modules are positioned within said lattice structure of said high voltage transmission tower in correspondence of a base of said high voltage transmission tower.

4. The arrangement according to claim 1, wherein said reference axes of said gas-tight casings of said first and second gas-insulated combined interruption and disconnection modules are aligned along a common axis.

5. The arrangement according to claim 1, wherein said reference axes of said gas-tight casings of said first and second gas-insulated combined interruption and disconnection modules are parallel to each other.

6. The arrangement according to claim 1, further comprises a third combined interruption and disconnection module having a third terminal operatively connectable to an end user, and a fourth terminal electrically interposed between and connected to said first and second combined interruption and disconnection modules.

7. The arrangement according to claim 6, wherein said third combined interruption and disconnection module is positioned within said lattice structure of said high voltage transmission tower at a same height of said first and second combined interruption and disconnection modules.

8. The arrangement according to claim 6, wherein said third combined interruption and disconnection module is positioned within said lattice structure of said high voltage transmission tower at a different height with respect to said first and second combined interruption and disconnection modules.

9. The arrangement according to claim 1, wherein said plurality of gas-insulated combined interruption and disconnection modules further includes a third combined interruption and disconnection module, said first terminal of said third combined interruption and disconnection unit being operatively connectable to said end user, and said second terminal of said third combined interruption and disconnection unit being electrically interposed between and connected to said first and second combined interruption and disconnection modules.

10. The arrangement according to claim 9, wherein said reference axes of said gas-tight casings of said first, second, and third gas-insulated combined interruption and disconnection modules are parallel to each other.

11. The arrangement according to claim 9, wherein said reference axes of said gas-tight casings of said first and second gas-insulated combined interruption and disconnection modules are aligned along a common axis, and said reference axis of said gas-tight casing said third gas-insulated combined interruption and disconnection module is substantially perpendicular to said reference axes of said gas-tight casings of said first and second gas-insulated combined interruption and disconnection modules.

12. The arrangement according to claim 11, wherein said third combined interruption and disconnection module is positioned within said lattice structure of said high voltage transmission tower at a different height with respect to said first and second combined interruption and disconnection modules.

13. The arrangement according to claim 9, wherein said reference axes of said gas-tight casings of said first, second, and third second gas-insulated combined interruption and disconnection modules are substantially vertical.

14. The arrangement according to claim 1, wherein said reference axes of said gas-tight casings of said first and second gas-insulated combined interruption and disconnection modules are substantially horizontal.

15. A high voltage gas-insulated switchgear comprising:

a supporting structure configured to be connected to a lattice structure of a high voltage transmission tower; and a first and a second gas-insulated combined interruption and disconnection modules, each of said first and second gas-insulated combined interruption and disconnection modules comprising, for each phase:

a combined interruption and disconnection unit, each of said combined interruption and disconnection unit comprising a gas-tight casing developing along a reference axis and housing at least a terminal for at least an input/output connection;

a first combined disconnecting and earthing switch having a first fixed contact operatively coupled to said first terminal of said at least said terminal, a second fixed contact at ground potential and a first movable contact operatively couplable to said first and second fixed contacts for disconnecting and earthing operations;

a second combined disconnecting and earthing switch, said second combined disconnecting and earthing switch having a third fixed contact operatively coupled to a second terminal of said at least said terminal, a fourth fixed contact at said ground potential and a second movable contact operatively couplable to said third and fourth fixed contacts for disconnecting and earthing operations, a fast earthing switch interposed between said first fixed contact and said first terminal; and a circuit breaker unit electrically connected to said first movable contact of said first combined disconnecting and earthing switch and to said second movable of said second combined disconnecting and earthing switch, said first terminal of said first combined interruption and disconnection unit being electrically connected to a first electrical line, said first terminal of said second interruption and disconnection unit being electrically connected to a second electrical line, said second terminals of said first and second combined interruption and disconnection units being electrically coupled to each other, said high voltage gas-insulated switchgear configured to be mounted on said supporting structure within said lattice structure of said high voltage transmission tower, said reference axes of said gas-tight casings of said first and second gas-insulated combined interruption and disconnection modules being aligned in a same direction, and said first and second combined interruption and disconnection modules configured to be positioned at a height within said lattice structure of said high voltage transmission tower.

16. The high voltage gas-insulated switchgear according to claim 15, wherein said first and second combined interruption and disconnection modules are configured to be positioned within said lattice structure of said high voltage transmission tower in correspondence of a base of said high voltage transmission tower.

17. The high voltage gas-insulated switchgear according to claim 15, wherein said reference axes of said gas-tight casings of said first and second gas-insulated combined interruption and disconnection modules are aligned along a common axis.

18. The high voltage gas-insulated switchgear according to claim 15, wherein said first and second reference axes of said gas-tight casings of said first and second gas-insulated combined interruption and disconnection modules are parallel to each other.

19. A method of mounting a high voltage gas-insulated switchgear to a high voltage transmission tower, the method comprising:

connecting a supporting structure of said high voltage gas-insulated switchgear to a lattice structure of said high voltage transmission tower, said high voltage gas-insulated switchgear comprising:

a first and a second gas-insulated combined interruption and disconnection modules, each of said first and second gas-insulated combined interruption and disconnection modules comprising, for each phase:

a combined interruption and disconnection unit, each of said combined interruption and disconnection unit comprising a gas-tight casing developing along a reference axis and housing at least a terminal for at least an input/output connection;

a first combined disconnecting and earthing switch having a first fixed contact operatively coupled to said first terminal of said at least said terminal, a second fixed contact at ground potential and a first movable contact operatively couplable to said first and second fixed contacts for disconnecting and earthing operations;

a second combined disconnecting and earthing switch, said second combined disconnecting and earthing switch having a third fixed contact operatively coupled to a second terminal of said at least said terminal, a fourth fixed contact at said ground potential and a second movable contact operatively couplable to said third and fourth fixed contacts for disconnecting and earthing operations, a fast earthing switch interposed between said first fixed contact and said first terminal; and a circuit breaker unit electrically connected to said first movable contact of said first combined disconnecting and earthing switch and to said second movable of said second combined disconnecting and earthing switch, electrically connecting said first terminal of said first combined interruption and disconnection unit to a first electrical line;

electrically connecting said first terminal of said second interruption and disconnection unit to a second electrical line, electrically connecting said second terminals of said first and second combined interruption and disconnection units to each other, and said reference axes of said gas-tight casings of said first and said second gas-insulated combined interruption and disconnection modules being aligned in a same direction.

20. The method according to claim 19, further comprising positioning said first and second combined interruption and disconnection modules within said lattice structure of said high voltage transmission tower in correspondence of a base of said high voltage transmission tower.

* * * * *